Feb. 26, 1935.  R. L. ANDERSON  1,992,172
THRESHER
Filed Jan. 19, 1931  2 Sheets-Sheet 1

INVENTOR
Ralph L. Anderson
BY Brown, Jackson
Boettcher & Dienner
ATTORNEY

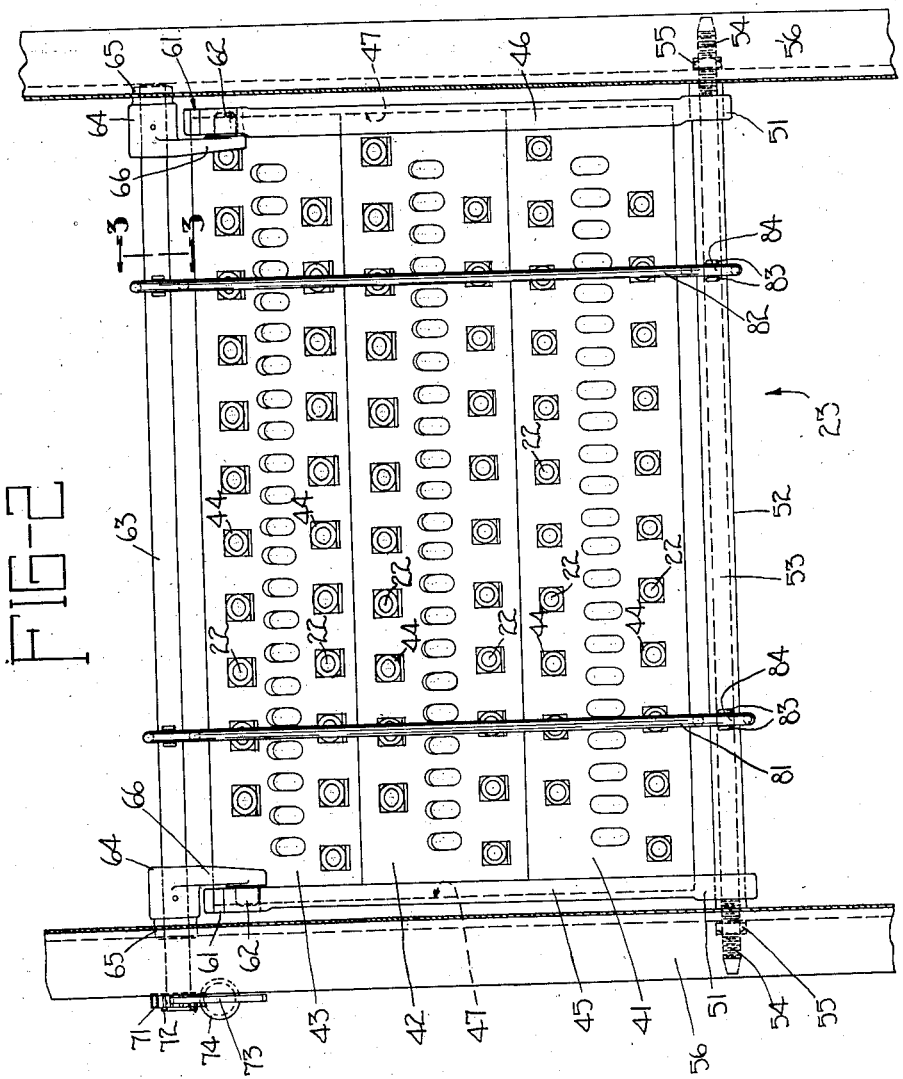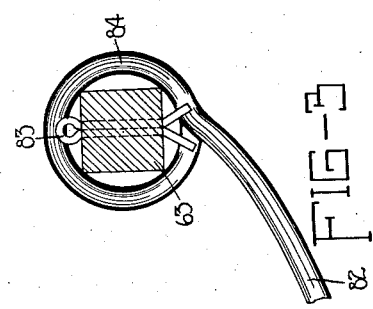

Patented Feb. 26, 1935

1,992,172

UNITED STATES PATENT OFFICE 1,992,172

THRESHER

Ralph L. Anderson, Moline, Ill., assignor to Deere & Company, Moline, Ill., a corporation of Illinois Application January 19, 1931, Serial No. 509,665

14 Claims. (Cl. 130—27)

The present invention appertains to threshers either of the stationary threshing machine type or of the combine type including a traveling harvester and thresher, and is concerned more particularly with improvements relating to the well known "concaves" which coact with the threshing cylinder for removing the grain from the stalks.

It is a common occurrence, particularly in combines, for foreign material to be picked up and worked through the threshing mechanism along with the grain. Such foreign material, when in the form of rocks or stones, frequently breaks the concave supports in such a mechanism and consequently allows the concaves to drop down upon the grain conveyor and to be carried through the separating and screening mechanism, where they are almost certain to cause considerable injury to the latter mechanism or to the conveyor. Such damage is not only expensive but causes considerable loss of time in making proper repairs.

The improvement which I have perfected provides against the dropping of concaves upon the grain conveyor in a threshing mechanism, and therefore, prevents the usual injury or damage resulting from such accidents.

Other objects and advantages will be apparent to those skilled in the art from a consideration of the following specification in conjunction with the accompanying drawings; in which Figure 1 is a fragmentary longitudinal view, in section, through the threshing portion of a combine;

Figure 2 is an enlarged bottom plan view of the concaves; and

Figure 3 is a detail cross sectional view taken along the line 3—3 of Figure 2.

Figure 1:
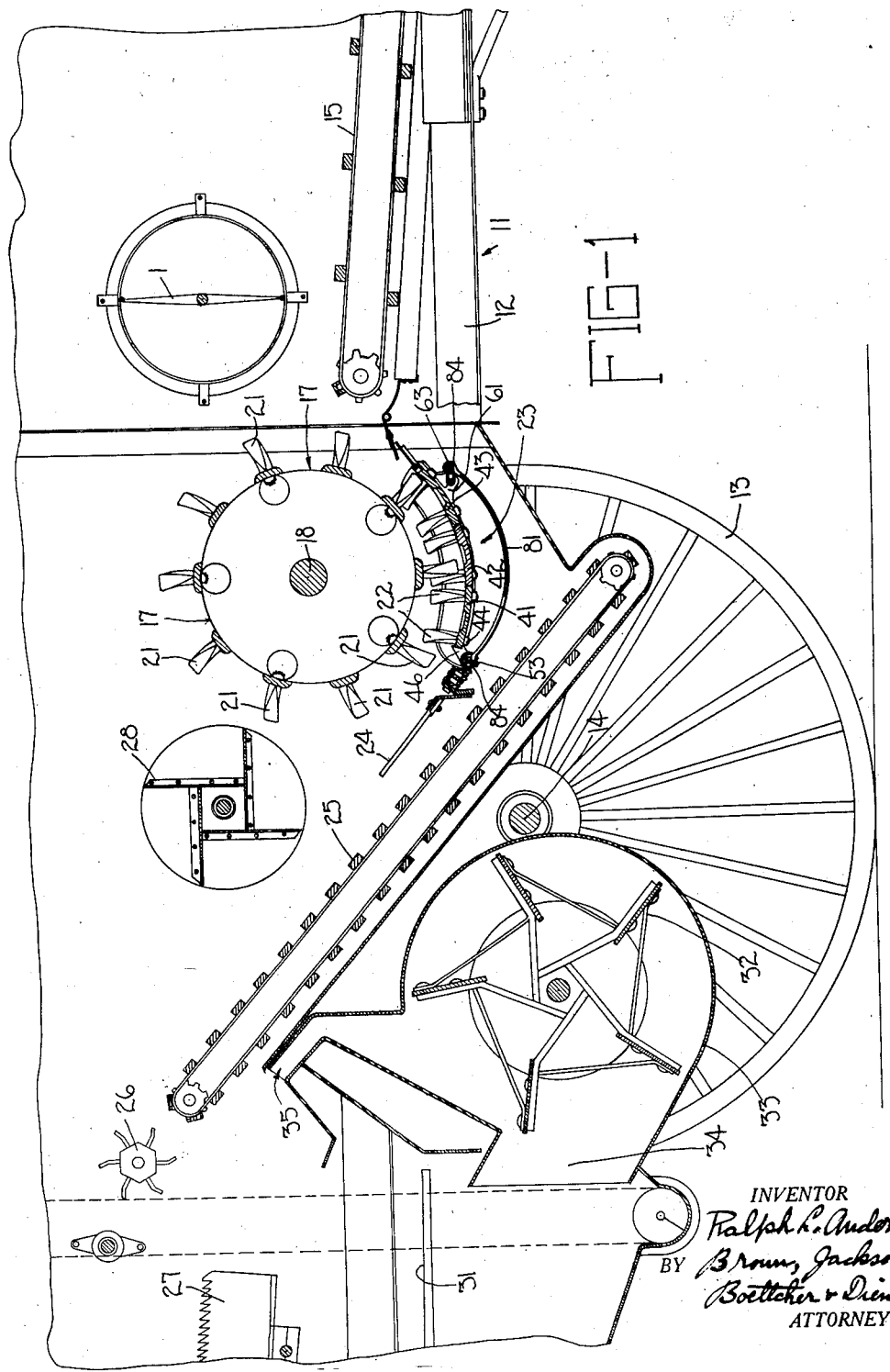

The embodiment of my invention is shown in a combined harvester and thresher because such implements are particularly subject to picking up stones or the like in traveling across a field, with the likelihood of damage to the concave supports by such stones being caught between the concaves and the threshing cylinder. It is, however, to be undertsood that the invention is not limited to this type of implement but can be employed in stationary threshers and other implements.

Now referring more particularly to Figure 1, the thresher portion of the combined harvester and thresher is indicated generally at 11, and comprises a frame 12 supported on wheels 13 and axle 14. The cut grain is dropped upon a lateral conveyor, not shown, from which it is transferred to the main conveyor 15.

As the grain proceeds on this main conveyor 15, the fan or beater 16 forces the grain into the throat of the threshing cylinder 17. The threshing cylinder 17 is of any suitable construction well known in the art, and is mounted on the shaft 18. The cylinder 17 carries a number of teeth 21 for operating in conjunction with the teeth 22 on the concave unit 23.

The grain passes between the rotating cylinder 17 and concave 23, where the main threshing operation takes place, and cylinder 17 forces the straw over a row of spring fingers 24 on to the inclined conveyor 25. A beater 28 continues the threshing operation on the upward passage of the grain on the conveyor 25. The grain falling through openings in the concave unit and also being swept off the rear edge of the unit, falls upon the conveyor 25 and is carried upwardly thereby. When the grain and straw reach the top of the inclined conveyor 25, the picker or beater 26 engages the straw to move it on to the straw walker 27, while the grain is deposited upon the cleaning shoe 31. A blower fan 32 is disposed in the casing 33 below the inclined conveyor 25, and currents of air from this blower passing through the duct 34 are directed through the cleaning shoe 31 to remove the chaff and other light particles from the grain. The currents of air which are exhausted from the duct 35 aid in separating the heads from the straw, and also aid to force the straw along the straw walker 27.

Returning to the concave unit 23 which is mounted below the cylinder 17, this concave unit preferably consists of three sections 41, 42, and 43, as best seen in Figure 2. Each of these sections 41, 42, and 43 are substantial duplicates, and each section is provided with two rows of threshing teeth 22, the underside of which carry nuts 44.

The concaves are mounted in supports or castings 45 and 46, the ends of the concaves being received in arcuate grooves or channels 47 formed in the sides of the castings. The castings have perforated lugs 51 formed at their rear ends, which are journaled for rocking movement on a tubular cross shaft 52. A rod 53, threaded at either end 54, is passed through the tubular shaft 52 and is bolted, as at 55, to the sides of the thresher casing.

The forward ends of the supporting castings 45 and 46 are provided with depending lugs 61 having longitudinally extending slots 62. A square shaft 63 is mounted between the side members 56, and this shaft carries a pair of bosses 64 having reduced portions 65, which reduced portions are journaled in the sides 56 of the thresher casing. The bosses 64 have arms 66 which extend rearwardly therefrom. The ends of these arms 66 have lateral projections which engage in the slots 62. The rod 63 may be turned to rock the arms 66 which, in turn, raises or lowers the front end of the concave assembly.

The mechanism for turning the rock shaft 63 comprises a worm gear 71 secured by a cotter key 72 on the extended end of the square shaft 63. An adjusting handle 73 carries a worm 74 which engages the gear 71 on the shaft 63. Turning of the handle will adjust the position of the concaves 23 relative to the threshing cylinder 17.

Beneath the concaves, a pair of rods 81 and 82 are mounted, the looped ends 84 of which preferably encircle the shafts 52 and 63. The rods 81 and 82 are held against sidewise shifting on the shafts by cotter keys 83 or in any other suitable manner. The fore and aft ends of these rods being secured to the shafts 52 and 63 are therefore independently mounted relative to the concaves. The center of each rod is also bowed or curved away from the concave 23 so that it will not interfere with the vertical adjustment of the concaves. In being suspended from the shafts 52 and 53, the rods are positioned in spaced relation transversely below the concave units 41, 42, and 43 to receive or catch the individual units or the whole assembly if the latter should become dislodged from the brackets 45 and 46. If rocks or stones are delivered to the threshing mechanism from the conveyor 15, these rocks frequently become jammed or caught between the concave units and the threshing cylinder. In such instances should either of the concave supports 45 or 46 break under the strain the concaves will drop, but instead of dropping on to the conveyor 25 as has heretofore been the case, they will be caught by the curved rods 81 and 82, and will not be conveyed through the remaining parts of the threshing machine as heretofore. Consequently serious injury and damage is prevented.

It is generally the case where rocks are caught between the threshing cylinder and the concave units for the brackets 45 or 46 to first break under the strain, but, however, should the shaft 52 be sheared from the frame members 56, the rods 81 and 82, still being anchored to the rod 63, will prevent the whole assembly 23 from being carried into the remainder of the threshing machine. The same is also true should only the rod 63 be sheared from the frame members 56, the opposite shaft 52 and rods 81—82 would then prevent the concave assembly 23 from being carried into and damaging the remaining parts of the threshing machine.

It will be seen that the two rods 81 and 82 act as concave catchers and it is understood that I may employ any number of such rods or their equivalent to catch the concaves in case their supports are broken. Incidentally, the manner in which I mount the concave catchers does not interfere with the raising and lowering movement of the concave base or the rotation of the shafts 52 and 63, yet, at all times the concave catchers are in juxtaposition to the concave base members 41, 42, and 43. While I have shown a preferred method of connecting the concave catchers to the shafts, other similar means for attaching them may equally well be employed so long as the same allows proper movement of the shafts. Such other adaptations fall within the spirit and scope of the appended claims.

What I claim is:

1. In a threshing mechanism of the class described, the combination of a frame, a rotating cylinder, a concave below said cylinder, conveying means for supplying grain to be threshed between said cylinder and concave, supporting castings for said concave, shafts supported on said frame, said castings being mounted upon said shafts, and rods disposed below said concave and adapted to catch the same if it is accidentally detached from said supports.

2. In a threshing mechanism of the class described, the combination of a frame, a rotating cylinder, a concave below said cylinder, conveying means for supplying grain to be threshed between said cylinder and concave, supporting castings for said concave, shafts mounted one at either end of said concave and supported in said frame, and rods disposed between said shafts providing catchers for said concave if the latter becomes dislodged from said supporting castings.

3. In a threshing mechanism of the class described, the combination of a frame, a rotating cylinder, a concave, conveying means for supplying grain to be threshed between said cylinder and concave, supporting castings for said concave, shafts mounted one at either end of said concave and supported in said frame, and spaced rods connected to said shafts and providing catchers for said concave if the latter becomes dislodged from said supporting castings, one of said shafts being capable of rotating relative to said spaced rods while maintaining the rods in juxtaposition to said concave.

4. In a threshing mechanism of the class described, the combination of a frame, a rotating cylinder, a concave below said cylinder, means for conveying threshed grain away from said cylinder, mechanism for screening and separating the grain, said conveying means being adapted to move the threshed grain to said screening and separating mechanism, and a plurality of bar members extending below said concave and having their ends supported fore and aft of said concave, said members being operative to catch said concave if the latter should become completely detached from the frame and thereby preventing the latter from moving into a position where it would be conveyed into and damage said screening and separating mechanism.

5. In a threshing machine, the combination of a threshing cylinder, concave members, mounting elements positioned transversely of said thresher, supports for said concave members connected with the end portions of said mounting elements and adapted to support said concave members in operative relation to said threshing cylinder and beneath the same, and means extending below said concave members and connected intermediate the end portions of said mounting elements and below said concave members, said means being adapted to prevent the concave members from dropping upon the thresher mechanisms if said members become detached from the aforesaid supports.

6. In a threshing machine, the combination of a rotatable threshing element, a concave element supported below the aforesaid element, operable thresher mechanism disposed below the threshing and concave elements and cooperating therewith, and link means supported on said thresher and interposed between the thresher mechanism and the aforesaid threshing and concave elements to prevent detached parts of said elements from dropping on said thresher mechanism.

7. In a threshing machine, the combination of a threshing cylinder, concave members cooperating with said cylinder, spaced supporting members mounted transversely on said thresher and supporting said concave members therebetween, and a plurality of link elements extending between said supporting members and below said concave members, said links each having their ends embracing said spaced supporting members, and means detachably connected with said supporting members to position said links in spaced relation to each other and to lock the same against movement along said transversely disposed supporting members.

8. In a threshing machine including conveyor mechanism, the combination of a toothed threshing member, toothed concave members supported below the aforesaid member and cooperating therewith, said threshing and concave members being disposed above said conveyor mechanism, and guard means for said conveyor mechanism mounted on said thresher and extending substantially horizontally below said toothed concave members and spaced from the teeth of said threshing member at a distance approximately equal to the overall height of said toothed concave members, said guard means being adapted to prevent accidently detached concave members from dropping into the conveyor mechanism and to hold the same out of the path of the teeth of said threshing member.

9. In a threshing machine of the class described, the combination of a frame, a rotating cylinder, a concave below the cylinder, and a pair of spaced rods disposed below said concave and transversely thereof and supported from the frame, the rods providing means for catching the concave if the latter becomes freed from its support.

10. In a threshing machine, the combination of a housing, a transversely disposed threshing cylinder within said housing, a pair of concave supporting brackets in said housing, one disposed adjacent each end of and below said cylinder and each bracket having an arcuate channel on its inner side, a plurality of transversely disposed concave sections having their ends loosely disposed in the channels in said brackets, the aforesaid connection of said concave sections with said brackets permitting said sections to fall free of said brackets whenever either bracket breaks, and transversely spaced, longitudinally disposed members arranged underneath said concave sections to catch the latter in case they fall free of said brackets.

11. In a threshing machine, the combination of a housing, a transversely disposed threshing cylinder within said housing, a pair of concave supporting brackets in said housing, one disposed adjacent each end of and below said cylinder and each bracket having an arcuate channel on its inner side, a plurality of transversely disposed concave sections having their ends loosely disposed in the channels in said brackets, the aforesaid connection of said concave sections with said brackets permitting said sections to fall free of said brackets whenever either bracket breaks, and a pair of transversely spaced, longitudinally disposed rods arranged underneath said concave sections to catch the latter in case they fall free of said brackets.

12. In a threshing machine, the combination of a housing having a transversely disposed threshing cylinder within the housing, a pair of concave supporting brackets in the housing, one disposed adjacent each end and below said cylinder, a plurality of transversely disposed concave sections extending under the cylinder and supported at their ends by said brackets, the connections of said concave sections with said brackets permitting said sections to fall free of said brackets away from the cylinder whenever either bracket breaks, and means extending across the under surfaces of said concave sections and adapted to catch any one or more of the sections in case they fall free of said brackets.

13. In a threshing machine, the combination of a housing, a transversely disposed threshing cylinder within said housing, a pair of concave supporting brackets in said housing, one disposed adjacent each end of and below said cylinder and each bracket having a channel on its inner side, a plurality of transversely disposed concave sections extending under the cylinder and having their ends loosely disposed in the channels in said brackets, the aforesaid connection of said concave sections with said brackets permitting said sections to fall free of said brackets whenever either bracket breaks, and means disposed below the under surfaces of said concave sections and spaced therefrom to catch any one or more of the sections in case they fall free of said brackets.

14. In a threshing machine, the combination of a housing, a transversely disposed threshing cylinder within said housing, a pair of concave supporting brackets in said housing, one disposed adjacent each end of and below said cylinder and each bracket having an arcuate channel on its inner side, a plurality of transversely disposed concave sections extending under the cylinder and having their ends loosely disposed in the channels in said brackets, the aforesaid connection of said concave sections with said brackets permitting said sections to fall free of said brackets whenever either bracket breaks, and open work intercepting means arranged underneath the under surfaces of said concave sections to catch and support the latter in case they fall free of said brackets.

RALPH L. ANDERSON.